July 4, 1950  W. R. KANNE  2,513,805
DETECTING DEVICE
Filed Aug. 4, 1943  2 Sheets-Sheet 1

Inventor:
William Rudolph Kanne
By: Robert A. Lavender
Attorney

July 4, 1950 W. R. KANNE 2,513,805
DETECTING DEVICE

Filed Aug. 4, 1943 2 Sheets-Sheet 2

Inventor:
William Rudolph Kanne
By Robert A. Lavender
Attorney

Patented July 4, 1950

2,513,805

UNITED STATES PATENT OFFICE 2,513,805

DETECTING DEVICE

William Rudolph Kanne, Chicago, Ill., assignor to the United States of America as represented by the United States Atomic Energy Commission Application August 4, 1943, Serial No. 497,343

5 Claims. (Cl. 250—78)

The invention relates to a detecting instrument which is particularly suitable for detecting radioactivity.

It is an object of the invention to provide an inexpensive fluorescent instrument for detecting radioactivity in which a contrasting visual effect is obtained in the presence of radioactive substances. It is a further and more specific object of the invention to provide a detecting instrument which determines the direction from which rays emitted by radioactive substances originate. Further objects and advantages will appear from the following description.

Figure 1:
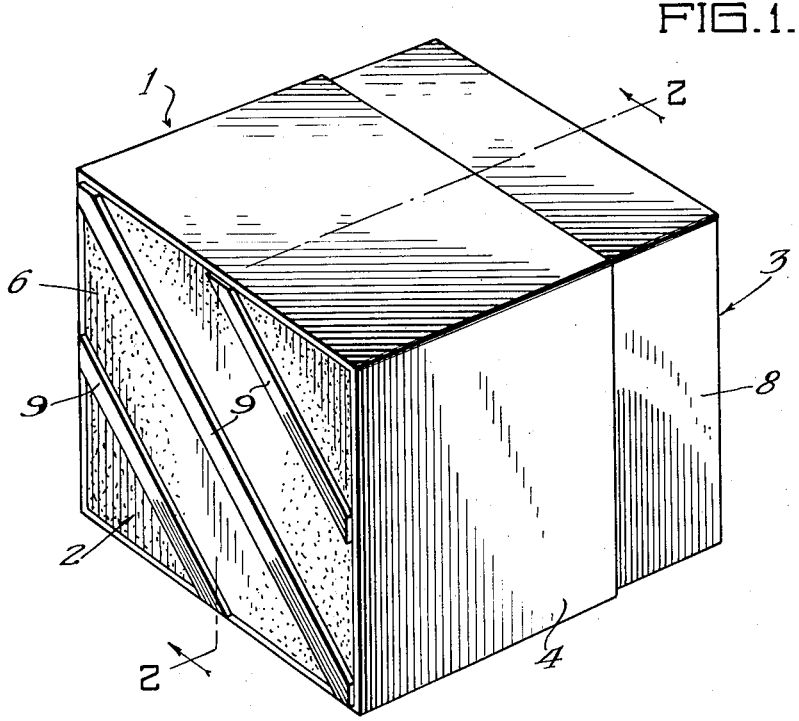
Figure 2:
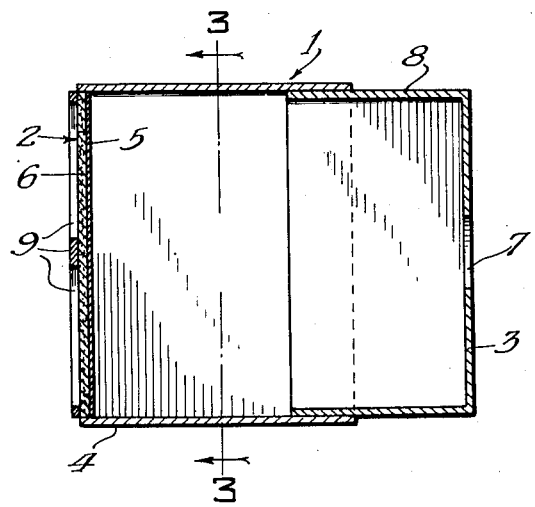
Figure 3:
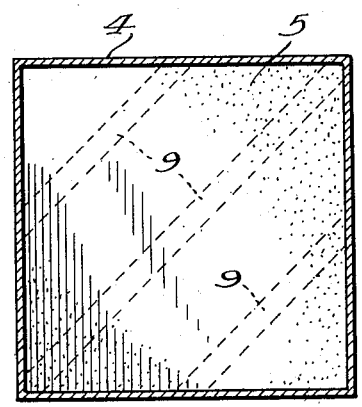
Figure 4:
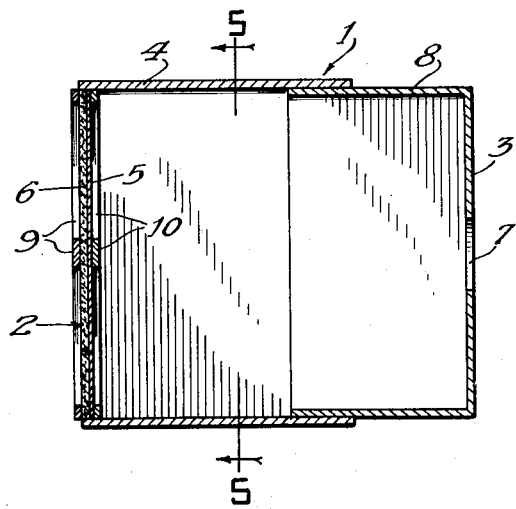
Figure 5:
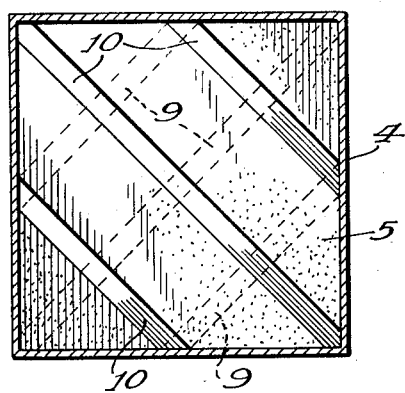
Figure 6:
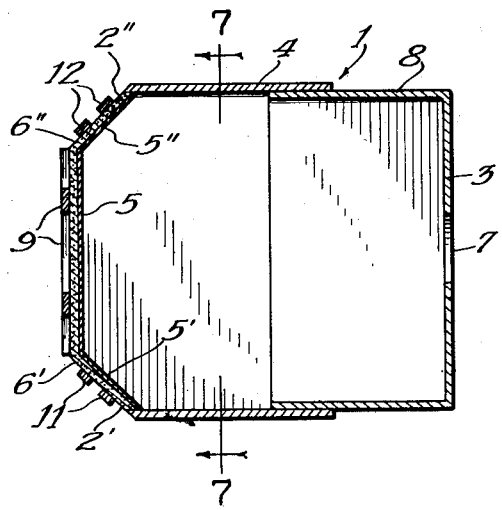
Figure 7:
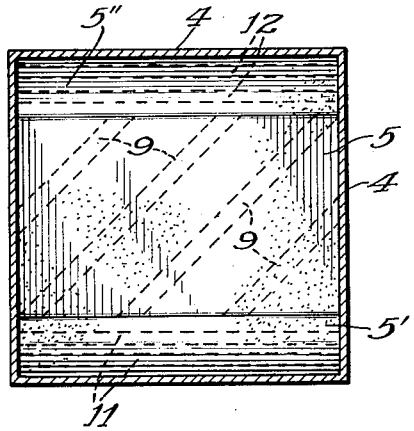

In the drawings in which like reference characters refer to like parts: Fig. 1 is a perspective view of one embodiment of the invention; Fig. 2 is a view taken on line 2—2 of Fig. 1; Fig. 3 is a view taken on line 3—3 of Fig. 2; Fig. 4 is a sectional view similar to the view shown in Fig. 2 of a modified form of the invention; Fig. 5 is a view taken in line 5—5 of Fig. 4; Fig. 6 is a plan sectional view of a further modification of the invention; and Fig. 7 is a view taken on line 7—7 of Fig. 6.

Briefly, the invention comprises an instrument for observing fluorescence having in combination therewith elements for absorbing radiant energy. Such elements, referred to as absorbers, are positioned on the instrument in such a manner that in the presence of radioactive substances the fluorescent effect is clearly indicated by the contrast between the fluorescing portion of the instrument and the non-fluorescing portion covered by the absorbers. While the contrast obtained by the use of the absorbers aids observation of the fluorescent effect, it has a further and more important function of indicating to the observer the direction from which the radiant energy causing the fluorescence is originating. Such direction finding is accomplished by positioning the absorbers so as to cause various patterns to be formed on the fluorescing portion of the instrument depending upon the location of the source of the radioactivity.

As shown in the drawings, the detecting instrument 1 comprises a screen 2 and an eyepiece 3 which are maintained in the proper apposite relationship by supporting means 4. The screen 2 is formed of a fluorescent material 5 on a base 6, which may be of glass, fabric, cardboard or other material having sufficient structural strength to carry the fluorescent material and which will permit passage therethrough of rays emitted by radioactive substances. The fluorescent material 5 may be zinc sulfide, calcium tungstate or other material which will be activated upon exposure to radioactive substance. The fluorescent material is applied to base 6 in any convenient mannner.

Eyepiece 3 comprises a portion of supporting means 4 and may consist of an opening 7 of sufficient diameter to permit observation of screen 2. In the simplest form of the invention, the function of the eyepiece may be performed by ends 8 of the supporting means. If desired, eyepiece 3 in the form shown in Fig. 2 may include one or more lenses (not shown) of proper focal length to aid observation of the screen.

Screen 2 and eyepiece 3 may be attached to and supported by means 4 in proper apposite position to permit the screen to be observed through the eyepiece. It is necessary that supporting means 4 be formed of a material impervious to ordinary light rays but which will permit passage therethrough of rays emitted by radioactive substances. Such supporting means should be sufficiently strong to properly support screen 2 and may consist of cardboard, heavy fabric, or the like. The supporting means 4, together with eyepiece 3, completely encloses, except for opening 7, the surface of screen 2 carrying fluorescent material 5. The screen portion is considered to be the front of the instrument.

For purposes of convenience, supporting means 4 may be constructed so that screen 2 will normally rest adjacent to eyepiece 3 and yet be extended to the proper distance for observation when the detector is in use. As shown in Figs. 1 and 2, supporting means 4 may be made in two or more portions, the portions telescoping within each other. The supporting means may also be made extensible in any other convenient manner as by using a heavy fabric properly creased to form a folding bellows.

To insure proper observation of the fluorescent effect, and particularly to indicate to the observer the location of radioactive substances, absorbing elements may be placed over portions of screen 2 to absorb rays emitted by radioactive materials and thereby prevent activation of the covered portions of the fluorescent material. Generally, such absorbers may be of any material such as lead, copper, or the like, in convenient shapes and sizes which will prevent the penetration of radioactive rays therethrough to screen 2. Lead strips one-eighth inch to one-quarter inch square in cross-section and of suitable length may be used for this purpose. The absorbers may be attached to screen 2 in any conventional manner. As shown in Figs. 1, 2, and 3, absorbers 9 are secured to the exterior surface of screen 2 in such a manner as to create a distinctive pattern on the screen when radioactive substances are in front of instrument 1 and the screen is observed through opening 7.

The contrast between the fluorescing and the non-fluorescing portions of the screen provided by the absorbers is particularly valuable where the observer slowly approaches the radioactive substance without being aware of its presence until indicated by the instrument. It is contemplated that such circumstances would exist where radioactive materials are distributed in a military operation. In such case, the observer's gradual approach to the radioactive material would cause the fluorescent effect on screen 2 to take place so slowly that the observer's eye, adjusting itself to the increasing light, would fail to observe the luminosity of the screen unless aided by the contrast resulting from the use of the absorbers. An important function of the absorbers is that of indicating the location of the radioactive substances by creating shadow patterns on the fluorescent screen. In the absence of radioactive material, screen 2 will be non-luminescent. Where there is radioactive material located behind the observer, the direction from which the rays are originating is indicated by the fact that the screen is fluorescent and does not show shadow patterns created by absorbers, such as absorbers 9, on the exterior surface of the screen. In such case, rays may also be coming from in front of the observer, although this can be ascertained only by pointing the instrument in the opposite direction to see if the same fluorescent effects without shadow patterns are obtained.

Where the rays are originating from a point in front of the observer, this is indicated by shadow patterns created on screen 2 by absorbers 9 which absorb the rays and prevent the portions of the screen covered by the absorbers from becoming luminescent. The approximate location of the radioactive material in front of the observer will be indicated by the particular pattern cast on the screen: where the radioactive substance is directly in front of the observer the absorbers 9 will be clearly outlined on the screen in their actual dimensions; where the radioactive substance is to the side and in front of the observer the outline of the absorbers will be enlarged and somewhat distorted inasmuch as the rays are striking the screen at an angle. To ascertain the exact location of the radioactive substance, the device may be manipulated until the exact pattern of the absorbers is shown on the screen. Where the screen is luminescent and without shadow patterns, indicating that there is radioactivity in the rear of the observer, the device may be pointed in the opposite direction to ascertain the exact location of the radioactive substance.

A modification of the invention is shown in Figs. 4 and 5 in which absorbers 10, which may be similar to absorbers 9, are positioned on the interior surface of the screen in such a manner as to create a distinctive pattern on screen 2. While absorbers 10 do not have a primary direction finding function, they do serve to provide a contrast effect which aids the observer in detecting the fact that the screen is luminescent or non-luminescent which in itself indicates the direction of the radioactive substance when the pattern of absorbers 9 is not shown on the screen. Where only the pattern of absorbers 10 is shown, the presence of radioactivity behind the observer is always indicated. Where the pattern of both absorbers 9 and 10 is shown, the presence of radioactivity in front of the observer is indicated.

Inasmuch as absorber 10 always causes its pattern to be shown on the screen irrespective of the direction from which the radioactive rays are coming, the same effect may be obtained by either omitting fluorescent material 5 from those portions of the interior surface of the screen 2 that would be otherwise covered by absorber 10 or covering such portions with an opaque substance. Therefore, references to absorbers 10 may be considered as including other means for masking portions of the interior surface of screen 2 irrespective of the ray-absorbing properties of such means.

A further modification of the invention is shown in Figs. 6 and 7 in which screen 2 includes side screens 2' and 2". The side screens are positioned at an angle, such as an angle of approximately 45°, between screen 2 and supporting means 4. Side screens 2' and 2" comprise fluorescent material 5' and 5" applied to base portions 6' and 6". On the exterior surface of the side screens are attached absorbers 11 and 12 which are similar to absorbers 9. Absorbers 11 and 12 form a pattern which is preferably different from that formed by absorbers 9.

The inclusion of side screens 2' and 2" increases the effectiveness of the detecting device as a direction finder by indicating the location of the radioactive material not only in front and in back of the observer, but also as to either side. Where the rays from radio-active substances are originating only in front of the observer, screens 2, 2', and 2" will be luminescent with the shadow patterns of absorbers 9, 11, and 12 being shown on their respective screens. Where the radioactive substance is located behind the observer, screens 2, 2', and 2" will be luminescent without the shadow pattern of the absorbers on the exterior surface of the screens being shown. Where the rays are originating at the left of the observer, screens 2' and 2" will be luminescent, screen 2 will be non-luminescent, and the shadow pattern of absorbers 11 will be shown on screen 2'. Where the rays originate at the right of the observer, screens 2' and 2" will be luminescent, screen 2 will be non-luminescent, and the shadow pattern of absorbers 12 will be shown on screen 2".

Where the rays originate from directions other than those mentioned, other patterns will be seen by the observer as, for example, where the rays originate from a point between in front and to the left of the observer, screens 2' and 2 will be luminescent, screen 2" will be non-luminescent, the pattern of absorber 11 will be shown on screen 2', and the pattern of absorbers 9 and 10 will be shown on screen 2. In the absence of radioactive substances, all of the screens will be non-luminescent.

The above detailed description is for purposes of illustration and the invention is to be limited only by the scope of the appended claims. The term "within the safety limits of said radiation field" as used in the claims is intended to denote presence within an area where radioactivity, if present, is below a radioactivity intensity which would tend to be injurious to living bodies.

What is claimed is:

1. In an instrument for detecting radioactivity, the combination of a plurality of fluorescent screens facing in different directions and at least one absorber associated with the exterior surface of one of said screens and partially shielding the screen with which it is associated.

2. In an instrument for detecting radioactivity, the combination of a plurality of fluorescent screens facing in different directions and at least one absorber associated with the exterior surface of each of said screens and partially shielding the screen with which it is associated.

3. A portable device for detecting radioactivity comprising a plurality of fluorescent screens facing different directions each having an absorber partially shielding the screen associated therewith, an eyepiece for observing said screens, and means for maintaining said screens and said eyepiece in apposite relationship, said plurality of screens including a forward screen maintained directly in front of said eyepiece by said means and a screen on either side of said forward screen, said side screens being maintained by said means at an angle with respect to said forward screen, and said screen adapted to provide an increasing luminescence resulting from the gradual movement of said instrument into the radiation field of a radioactive substance whereby a fluorescent contrast pattern is formed on said screen within the safety limits of said radiation field.

4. A method of detecting the direction of propagation of radiation emitted by a radioactive source of unknown location which comprises moving a portable detecting instrument comprising a fluorescent screen and an absorber partially shielding one side thereof, into a radiation field, viewing the opposite side of the screen and when a fluorescent pattern has been produced reversing the position of the screen and the absorber and comparing the patterns produced on the screen.

5. A method of detecting the general direction of a radioactive source of unknown location which comprises viewing one side of a plurality of fluorescent screens each of which faces a different direction and has a radioactivity absorber shielding a portion of the opposite side thereof, comparing the patterns produced on the screen by the shadow of the absorbers and thereby ascertaining the general direction of the source.

WILLIAM RUDOLPH KANNE.

REFERENCES CITED

The following references are of record in the file of this patent:

UNITED STATES PATENTS

| Number | Name | Date |
| --- | --- | --- |
| 788,151 | Hall | Apr. 25, 1905 |
| 1,242,377 | Schmidt | Oct. 9, 1917 |
| 1,370,640 | Granger | Mar. 8, 1921 |
| 1,948,552 | Weber et al. | Feb. 27, 1934 |
| 2,270,307 | Karnes | Jan. 20, 1942 |
| 2,322,082 | Wynd | June 15, 1943 |
| 2,334,765 | Hermann | Nov. 23, 1943 |
| 2,349,754 | Porter | May 23, 1944 |